(12) United States Patent
Muesa

(10) Patent No.: US 11,400,796 B2
(45) Date of Patent: Aug. 2, 2022

(54) COMBINED LUMINAIRE AND AIR CONDITIONING NOZZLE

(71) Applicant: Teknoware Oy, Lahti (FI)

(72) Inventor: Keny Muesa, Helsinki (FI)

(73) Assignee: Teknoware Oy, Lahti (FI)

( * ) Notice: Subject to any disclaimer, the term of this patent is extended or adjusted under 35 U.S.C. 154(b) by 362 days.

(21) Appl. No.: 16/526,204

(22) Filed: Jul. 30, 2019

(65) Prior Publication Data

US 2020/0039327 A1 Feb. 6, 2020

(30) Foreign Application Priority Data

Jul. 31, 2018 (FI) .................................... 20185666

(51) Int. Cl.
*B60H 1/34* (2006.01)
*B60H 1/24* (2006.01)
(Continued)

(52) U.S. Cl.
CPC ............. *B60H 1/3428* (2013.01); *B60H 1/24* (2013.01); *B60Q 3/54* (2017.02); *B60H 2001/3485* (2013.01); *B60Q 3/41* (2017.02)

(58) Field of Classification Search
CPC .................... B60H 1/3428; B60H 1/24; B60H 2001/3485; B60Q 3/54; B60Q 3/41;
(Continued)

(56) References Cited

U.S. PATENT DOCUMENTS 3,113,502 A * 12/1963 Kallel ...................... F16K 1/00
454/154
3,299,797 A 1/1967 Dry
(Continued)

FOREIGN PATENT DOCUMENTS

CN 106369785 A 2/2017
DE 1 219 346 B 6/1966
(Continued)

OTHER PUBLICATIONS

Park, KR101551089B1 English machine translation, Sep. 7, 2015 (Year: 2015).*

(Continued)

*Primary Examiner* — Steven S Anderson, II
*Assistant Examiner* — Phillip Decker
(74) *Attorney, Agent, or Firm* — Merchant & Gould P.C.

(57) ABSTRACT

A combined luminaire and air conditioning nozzle includes a front panel (101) with an opening. A nozzle frame (103) is pivotably connected to the opening of the front panel (101) so as to separate an air cavity (105) located behind the front panel (101) from a front side of the front panel (101). The structure includes a controller element (106) with a closing mechanism mechanically coupled thereto and arranged to adjustably limit an air passage (107) from the air cavity (105) to the front side of the front panel (101) in response to a movement of the controller element (106). A luminaire element (108) forms part of the closing mechanism and is provided with a light source arranged to output light to the front side of the front panel (101). The closing mechanism is arranged to convert a movement of the controller element (106) into a movement of the luminaire element (108), so that said adjustable limiting of the air passage (107) occurs as a result of said movement of the luminaire element (108).

9 Claims, 5 Drawing Sheets

Figure 1:
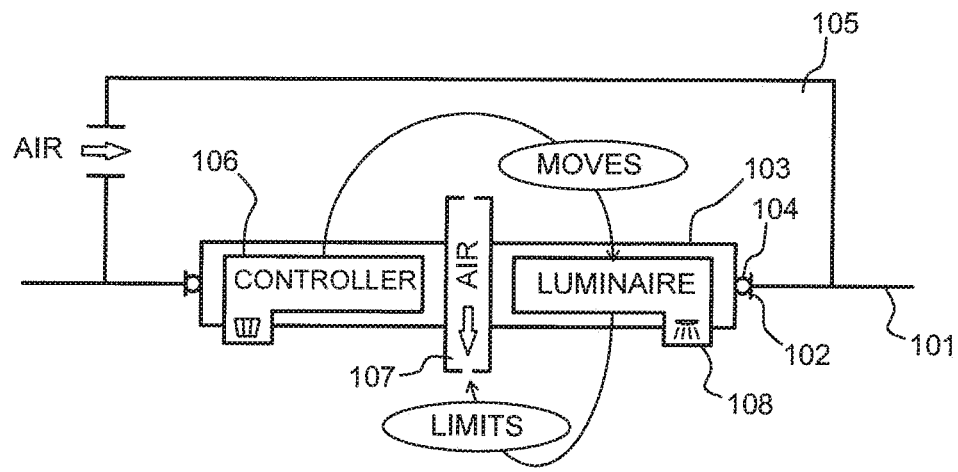

(51) Int. Cl.
*B60Q 3/54* (2017.01)
*B60Q 3/41* (2017.01)

(58) Field of Classification Search
CPC ........ B60Q 2500/20; B64D 2011/0053; B64D 2013/003
USPC .......................................................... 454/76
See application file for complete search history.

(56) References Cited

U.S. PATENT DOCUMENTS

| | | | |
|---|---|---|---|
| 4,142,227 A | | 2/1979 | Aikens |
| 4,259,897 A | | 4/1981 | Nederman |
| 9,045,235 B2 | * | 6/2015 | Rittner .................... B60Q 3/44 |
| 9,267,658 B2 | * | 2/2016 | Garcez da Silva ...... B60Q 3/76 |
| 2012/0199694 A1 | | 8/2012 | Rittner et al. |
| 2015/0036368 A1 | | 2/2015 | Rittner et al. |
| 2015/0124471 A1 | | 5/2015 | Garcez da Silva et al. |

FOREIGN PATENT DOCUMENTS

| | | |
|---|---|---|
| DE | 10 2014 018 302 A1 | 6/2016 |
| DE | 10 2016 011 703 A1 | 3/2018 |
| JP | H10-154414 A | 6/1998 |
| KR | 2010-0067169 A | 6/2010 |
| KR | 2014-0073235 A | 6/2014 |
| KR | 101551089 B1 * | 9/2015 |

OTHER PUBLICATIONS

Kono et al., JPH10154414A English machine translation, Jun. 9, 1998 (Year: 1998).*
Finnish Search Report for corresponding Finnish Patent Application No. 20185666 dated Feb. 22, 2019, 2 pg.
Extended European Search Report for corresponding European Patent Application No. 19188738.9 dated Nov. 29, 2019, 7 pages.

* cited by examiner

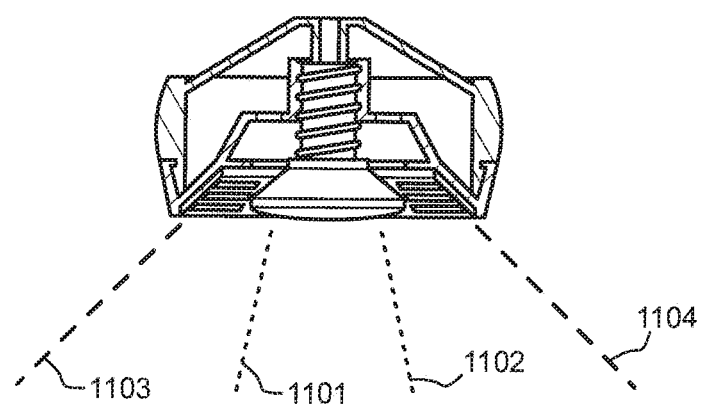
FIG. 11
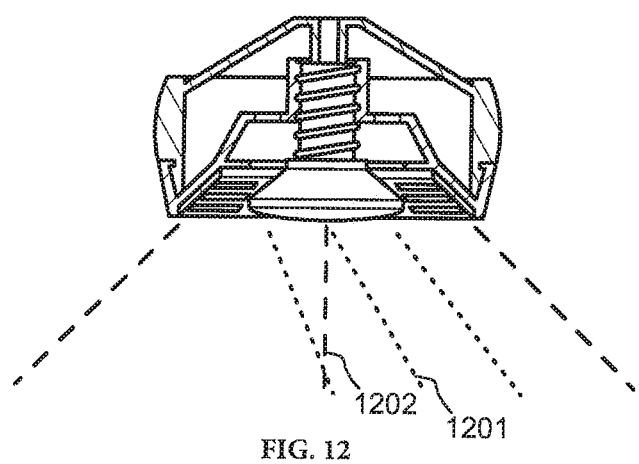
FIG. 12
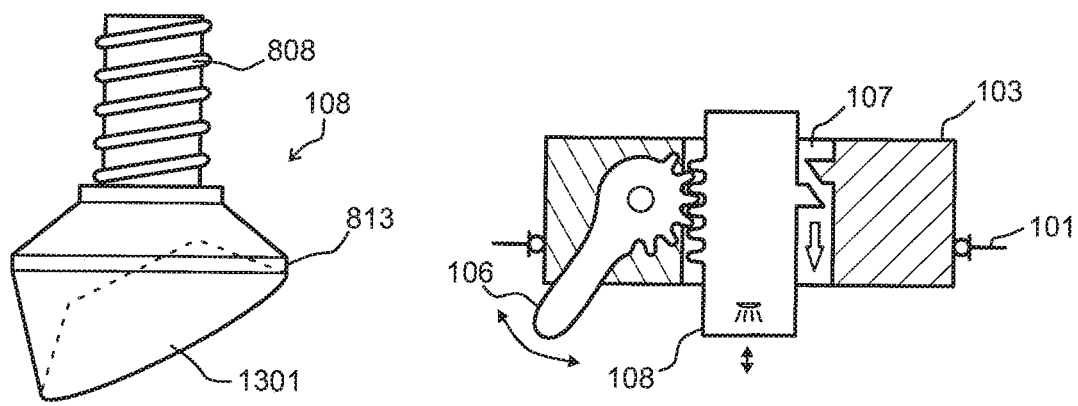
FIG. 13
FIG. 14

COMBINED LUMINAIRE AND AIR CONDITIONING NOZZLE

This application claims benefit of Serial No. 20185666, filed 31 Jul. 2018 in Finland, and which application is incorporated herein by reference. To the extent appropriate, a claim of priority is made to the above disclosed application.

FIELD OF THE INVENTION

The invention concerns arranging of illumination and air conditioning in a vehicle or other such site where light and fresh air are to be offered to a user very locally, and in such a way that the user may personally adjust them. Specifically the invention relates to a mechanical configuration by means of which the directing and adjusting of light and fresh air may be combined.

BACKGROUND OF THE INVENTION

Buses and airplanes are the most common examples of sites where an individual user (in a vehicle: passenger) may want to have light and fresh air in a way that is best suited for him or her at that moment. In the prior art, several service panel configurations are known which are typically located above two or three adjacent seats, with individually controllable and directable air conditioning nozzles and reading lights for each user.

The service panels according to the prior art may, however, occupy a relatively large space of the ceiling, wall or other structure of the vehicle, which limits the possibilities related to the design of the rest of that space. In addition, the user may feel that the user interface of the system is confusing and aesthetically unpleasant.

SUMMARY OF THE INVENTION

An object of the invention is to disclose a combined luminaire and air conditioning nozzle occupying only a small amount of space. In addition, an object of the invention is that the combined luminaire and air conditioning nozzle is affordable in terms of manufacturing technology. It is also an object of the invention that the combined luminaire and air conditioning nozzle is intuitive as to its user interface, such that it is easy for the user to learn how to use it. Further, an object of the invention is that the combined luminaire and air conditioning nozzle offers designers design possibilities, so that it is adaptable to many different surroundings and aesthetic arrangements.

The objects of the invention are achieved by providing the combined luminaire and air conditioning nozzle with a closing mechanism, one part of which is a luminaire element, a movement of which adjustably limits an air passage through the nozzle.

The combined luminaire and air conditioning nozzle described herein includes:
   a front panel with an opening,
   a nozzle frame pivotably connected to the opening of the front panel and arranged to separate an air cavity located behind the front panel from a front side of the front panel, and
   a controller element with a closing mechanism mechanically coupled thereto and arranged to adjustably limit an air passage from the air cavity to the front side of the front panel in response to a movement of the controller element.

The combined luminaire and air conditioning nozzle is characterized in that
   a luminaire element forms part of the closing mechanism and is provided with a light source arranged to output light to the front side of the front panel,
   the closing mechanism is arranged to convert a movement of the controller element into a movement of the luminaire element, so that said adjustable limiting of the air passage occurs as a result of said movement of the luminaire element.

According to one embodiment, the nozzle frame and the controller element share a common geometrical centre axis substantially perpendicular to the front panel, and the controller element is attached to the nozzle frame with a rotatable connection, whereby said movement of the controller element is its rotational movement about said common geometrical centre axis. This provides an advantage in terms of simplicity and manufacturability of the structure and intuitiveness of the user interface.

According to one embodiment, the closing mechanism is arranged to convert a rotational movement of the controller element relative to the nozzle frame into a linear movement of the luminaire element relative to the nozzle frame in a direction substantially perpendicular to the front panel. This provides the advantage that the direction of light from the luminaire element is not rotated with the adjustment of the fresh air flow.

According to one embodiment, the controller element has a first thread with a longitudinal axis substantially perpendicular to the front panel; the luminaire element has a second thread corresponding to and fitting on the first thread; and between the luminaire element and the nozzle frame there is a slide mechanism arranged to prevent rotation of the luminaire element relative to the nozzle frame. This provides the advantage that the structure and operating principles described above can be implemented in a mechanically simple and reliable way, causing only a moderate amount of friction.

According to one embodiment, said slide mechanism is provided with a limiter arranged to prevent the movement of the luminaire element further than a specific limit from the nozzle frame. This provides the advantage that the user may not accidentally remove the luminaire element.

According to one embodiment, the luminaire element includes a semiconductor light source and an optic for directing the light output by the semiconductor light source into a specific first sector on the front side of the front panel, and said air passage is arranged to direct the air flowing from the air cavity to the front side of the front panel into a specific second sector on the front side of the front panel. This provides the advantage that the directing of the light and the fresh air flow may be considered separately.

According to one embodiment, said second sector covers a wider solid angle than said first sector. This provides the advantage that at least part of the fresh air flow will fall on the user, even if the light is directed to the front or the side of the user.

According to one embodiment, a centre axis of said first sector is oriented in a different direction from a centre axis of said second sector. This provides the advantage that the full fresh air flow may be directed to the user, even if the light was directed to the front or the side of the user.

According to one embodiment, said air passage goes through an annular opening formed between an edge of a hole arranged in the controller element and said luminaire element arranged in said hole. This provides the advantage that the fresh air flow may be adjusted in the same way in the entire sector into which it is directed.

According to one embodiment, the pivotable connection of the nozzle frame to the opening of the front panel has a structure of a ball joint where parts of a spherical surface in the nozzle frame are arranged to move in a socket formed by edges of the opening of the front panel. This provides the advantage that directing is easy and intuitive for the user. At the same time, the structure can be made easily manufacturable and highly durable.

According to one embodiment, the controller element forms a round outer rim on the side of the nozzle frame facing towards the front side of the front panel. This provides an advantage in terms of intuitiveness of the user interface, and the part of the controller element which the user is intended to touch can be arranged far away from possibly strongly heated parts close to the light source.

LIST OF FIGURES

Figure 2:
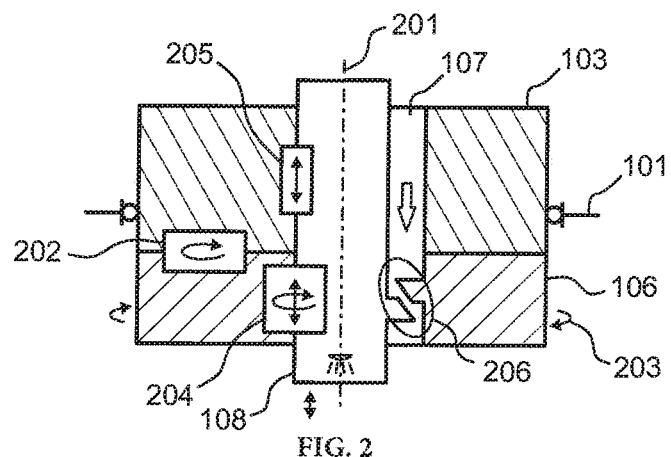
Figure 3:
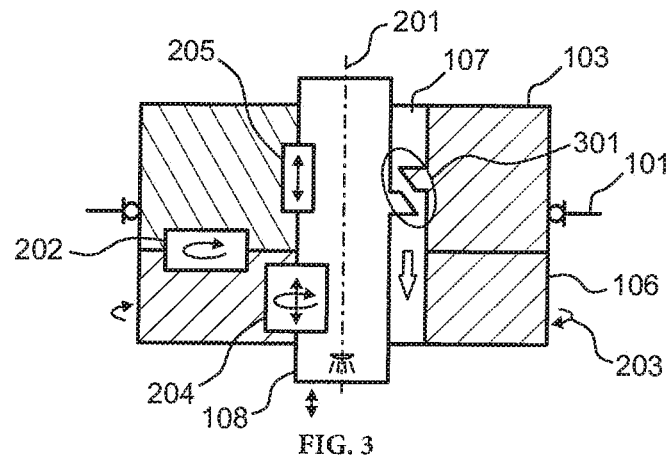
Figure 4:
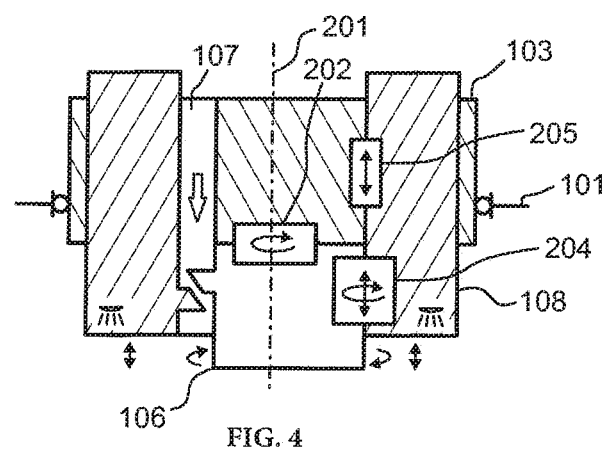
Figure 5:
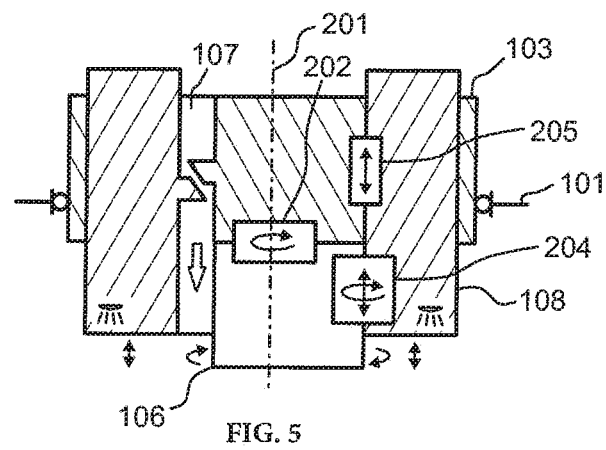
Figure 6:
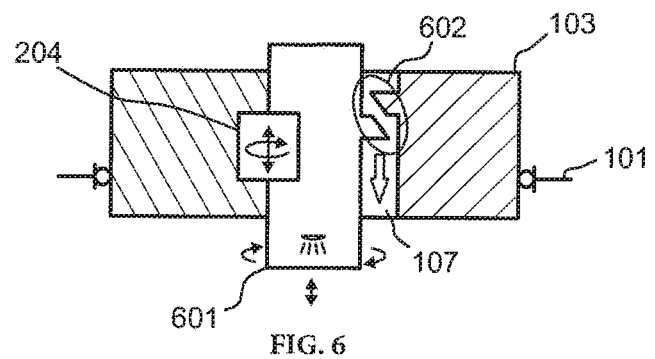
Figure 7:
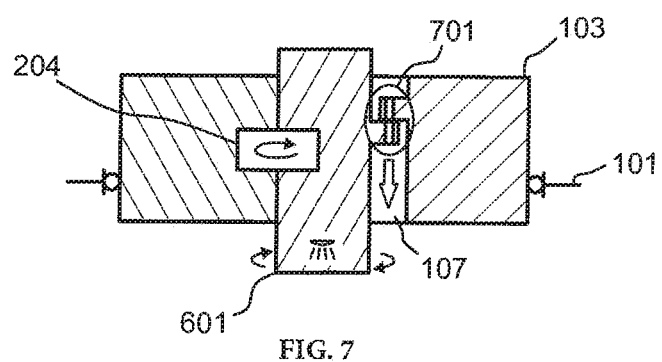
Figure 8:
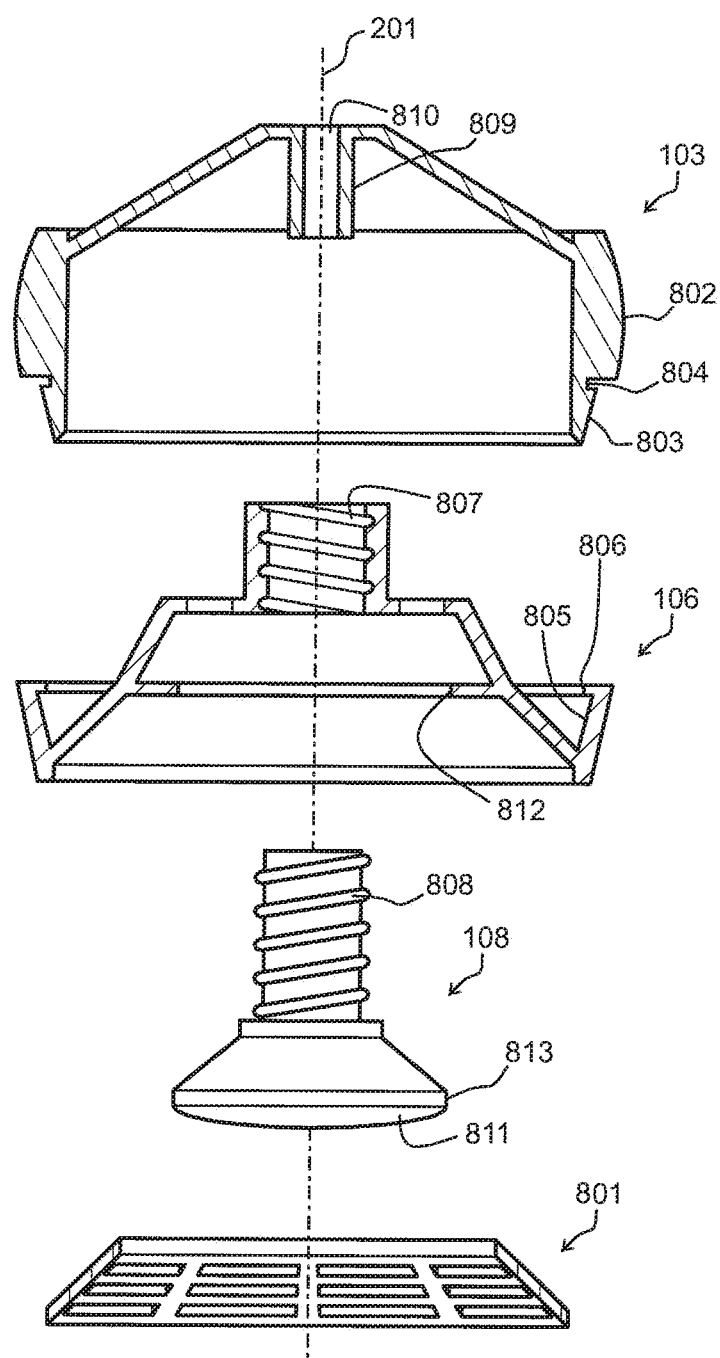
Figure 9:
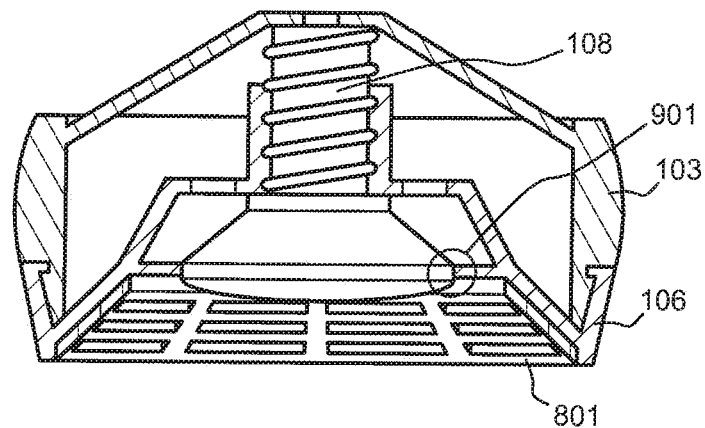
Figure 10:
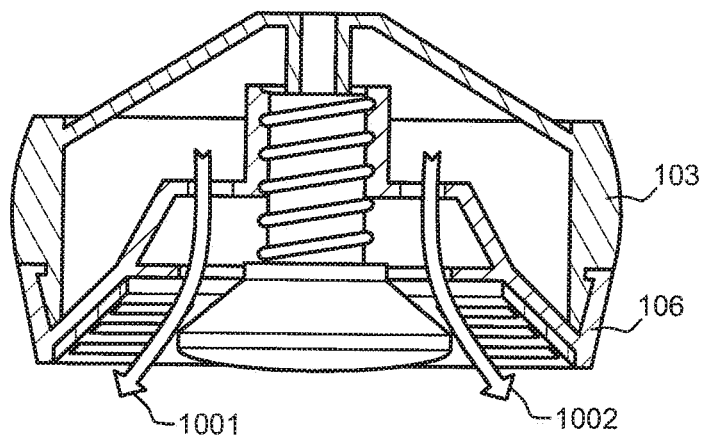

FIG. 1 illustrates an operating principle of a combined luminaire and air conditioning nozzle, FIG. 2 illustrates one relative arrangement and operation of the elements, FIG. 3 illustrates another relative arrangement and operation of the elements, FIG. 4 illustrates another relative arrangement and operation of the elements, FIG. 5 illustrates another relative arrangement and operation of the elements, FIG. 6 illustrates another relative arrangement and operation of the elements, FIG. 7 illustrates another relative arrangement and operation of the elements, FIG. 8 shows an exploded view of one combined luminaire and air conditioning nozzle, FIG. 9 illustrates the combined luminaire and air conditioning nozzle of FIG. 8 in an assembled state with the nozzle closed, FIG. 10 illustrates the combined luminaire and air conditioning nozzle of FIG. 8 in an assembled state with the nozzle open, FIG. 11 illustrates a combined luminaire and air conditioning nozzle outputting light and air in the same nominal direction, FIG. 12 illustrates a combined luminaire and air conditioning nozzle outputting light and air in different nominal directions, FIG. 13 illustrates one luminaire element, and FIG. 14 illustrates another relative arrangement and operation of the elements.

DETAILED DESCRIPTION OF THE INVENTION

FIG. 1 is a principle diagram illustrating the elements and the operating principle of a combined luminaire and air conditioning nozzle described herein. The structure comprises a front panel 101 with an opening delimited in FIG. 1 by edges 102. A nozzle frame 103 is pivotably connected to the opening of the front panel. The pivotable connection is represented in FIG. 1 by schematically illustrated ball bearings 104. The purpose of the front panel 101 is firstly to form a visible outer surface delimiting the interior of a bus, an airplane or other application site at the area where the combined luminaire and air conditioning nozzle is installed. It also serves the purpose of providing a natural way to install the combined luminaire and air conditioning nozzle. It is possible that the front panel 101 would be a continuous part of the rest of the interior design at the application site, but in a more typical configuration it is part of the luminaire and nozzle arrangement, i.e. a so-called service set. In that case the interior design of the application site is provided, for seat-specific illumination and air conditioning, with a slightly larger opening than what the luminaire and air conditioning nozzle as such would require. The manufacturer acquires a best-suited service set from a subcontractor and installs it.

A pivotable connection of the nozzle frame 103 is not necessary, but it is recommendable as users would often want to direct the air flow and light as desired. Examples of implementing the pivotable connection will be discussed in more detail hereinafter.

For supplying fresh air, the structure includes an air cavity 105 which is, as seen from the user's position, hidden behind the front panel 101 and the nozzle frame 103. The pivotable connection of the nozzle frame 103 to the opening of the front panel 101 is preferably made air-proof enough, so that air is not able to escape past the nozzle frame 103 to the front side of the front panel 101. In other words, the nozzle frame 103 is arranged to separate the air cavity 105 located behind the front panel 101 from the front side of the front panel 101. The supply air flows to the air cavity 105 for example from a centralized fresh air blower maintaining a sufficient pressure for the fresh supply air, such that the users may adjust it at each place as desired.

A closing mechanism mechanically coupled to a controller element 106 is arranged to adjustably limit an air passage 107 from the air cavity 105 to the front side of the front panel 101 in response to a movement of the controller element 106. At least part of the controller element 106 is most preferably present and visible on the front side of the front panel 101, such that the user may grab it and move it. In principle, it would be possible to make the controller element 106 electrically operated and remotely controlled, such that the user could move it for example with a smart phone application. However, at the time of writing this text a visible and mechanically hand-movable controller element is, in terms of structure and manufacturing technology, a simpler and more reliable solution as well as more affordable as to manufacturing costs.

A luminaire element 108 forms part of the closing mechanism and is provided with a light source arranged to output light to the front side of the front panel 101. The technical implementation of the light source does not have to be limited as such, but at the time of writing this text a led light source may be considered most preferred due to its small size, relatively low power requirement and good efficiency. Other possible light sources are for example laser diodes, organic leds (OLED), incandescent light bulbs and gas discharge tubes. The closing mechanism mentioned above is arranged to convert a movement of the controller element 106 into a movement of the luminaire element 108, so that the adjustable limiting of the air passage 107 occurs as a result of the movement of the luminaire element 108.

FIG. 2-7 are principle diagrams for different alternatives illustrating how the different elements of the combined luminaire and air conditioning nozzle may be located in the structure, connect to each other and affect each other's movements. These figures do not indicate any specific physical structure, but alternatives in principle.

In the example of FIG. 2, the nozzle frame 103 and the controller element 106 share a common geometrical centre axis 201 substantially perpendicular to the front panel 101.

The definition of substantial perpendicularity may in this case be very broad, because it only means that the so-called operating direction, i.e. the nominal direction in which the light and fresh air are directed, is rather away from than parallel to the surface of the front panel 101. The controller element 106 is in the example of FIG. 2 attached to the nozzle frame 103 with a rotatable connection which is in FIG. 2 schematically illustrated with symbol 202. Thus the movement of the controller element 106, which in turn affects the movement of the luminaire element 108, is a rotational movement of the controller element 106 about the common geometrical centre axis 201. The rotational movement of the controller element 106 is indicated with rotational arrows 203.

In the example of FIG. 2, the closing mechanism is arranged to convert a rotational movement of the controller element 106 relative to the nozzle frame 103 into a linear movement of the luminaire element 108 relative to the nozzle frame in a direction that is also substantially perpendicular to the front panel 101. In this case too, the definition of substantial perpendicularity is as presented above. The conversion of a rotational movement of the controller element 106 into a linear movement of the luminaire element 108 is schematically illustrated with symbol 204. The luminaire element 108 may be attached to the nozzle frame 103 with a linearly sliding connection indicated in FIG. 2 with symbol 205.

In the example of FIG. 2, the actual adjustable limiting of the air passage 107 occurs between the luminaire element 108 and the controller element 106. For this purpose the luminaire element 108 and the controller element 106 may have corresponding surfaces, the spacing of which (and thereby a free cross-section of the air passage 107 at that point) varies as the luminaire element 108 moves linearly as described above. In the principle diagram of FIG. 2 the corresponding surfaces are illustrated at point 206. When the luminaire element 108 is disposed in a first extreme position of its linear movement, the corresponding surfaces may be tightly fitted against each other, whereby the air passage 107 is substantially blocked and no fresh air flows through the nozzle. In a second extreme position of the linear movement of the luminaire element 108 the corresponding surfaces may be spaced at a greatest possible distance from each other, whereby the nozzle is fully open and the air flow through the air passage 107 is strongest.

FIG. 3 illustrates an alternative principle where the different elements of the combined luminaire and air conditioning nozzle are located, connected to each other and affect each other's movements as described with reference to FIG. 2. The difference is that the actual adjustable limiting of the air passage 107 occurs between the luminaire element 108 and the nozzle frame 103. For this purpose the luminaire element 108 and the nozzle frame 103 may have corresponding surfaces, the spacing of which (and thereby a free cross-section of the air passage 107 at that point) varies as the luminaire element 108 moves linearly as described above. In the principle diagram of FIG. 3 the corresponding surfaces are illustrated at point 301.

It is common to the principles of FIGS. 2 and 3 that the controller element 106 extends over a wider area in a lateral direction than the luminaire element 108. In other words, the luminaire element 108 is located in the combined luminaire and air conditioning nozzle at the centre of the area seen by the user and the controller element 106 is on the perimeter of the area. This is in no way an essential limitation, but other alternatives are also possible. FIGS. 4 and 5 illustrate an alternative principle where the controller element 106 is located at the centre of the area seen by the user, and the luminaire element 108 annularly surrounds the controller element.

The connections between the elements in FIGS. 4 and 5 are similar to those of FIGS. 2 and 3. The controller element 106 is attached to the nozzle frame 103 with a rotatable connection 202, such that the movement of the controller element 106 is a rotational movement about a common geometrical centre axis 201 of the controller element and the nozzle frame 103. According to symbol 204 the closing mechanism is arranged to convert a rotational movement of the controller element 106 into a linear movement of the luminaire element 108 relative to the nozzle frame 103 in a direction that is substantially perpendicular to the front panel 101. The luminaire element 108 may be attached to the nozzle frame 103 with a linearly sliding connection indicated in FIG. 4 with symbol 205. The difference between the principles of FIGS. 4 and 5 is whether the actual adjustable limiting of the air passage 107 occurs between the luminaire element 108 and the controller element 106 as in FIG. 4 or between the luminaire element 108 and the nozzle frame 103 as in FIG. 5.

It is common to all of the principles described above that the controller element and the luminaire element are two mechanically separate pieces. However, this is not a necessary requirement, as illustrated by FIGS. 6 and 7. FIG. 6 shows a combined controller and luminaire element 601 attached to the nozzle frame 103 with threads or other such connection in which rotation simultaneously causes a linear movement. This is illustrated with symbol 204. The air passage 107 from the air cavity to the front side of the front panel 101 is a simple channel extending between the nozzle frame 103 and the combined controller and luminaire element 601. The closing mechanism is provided, at point 602, with corresponding surfaces, the spacing of which (and thereby a free cross-section of the air passage 107 at that point) varies as the combined controller and luminaire element 601 moves linearly as described above.

The principle of FIG. 7 corresponds in other respects to the principle of FIG. 6, but the combined controller and luminaire element 601 is attached to the nozzle frame 103 with a rotatable connection 202 only. Further, the principle of the closing mechanism is different. The closing mechanism is provided, as indicated at point 701, with paired openings, such that when the openings in the nozzle frame 103 and the corresponding openings in the combined controller and luminaire element 601 are fully aligned, the air passage 107 is fully open. The air passage 107 is closed by sliding of the openings relative to each other from a fully aligned position to a fully non-aligned position. This variant has also general importance in view of the embodiments of the combined luminaire and air conditioning nozzle described herein, as it illustrates that in any embodiment, the adjustable limiting of the air passage may be implemented in many different ways.

FIG. 8 shows an exploded view of one combined luminaire and air conditioning nozzle. The front panel is not shown in FIG. 8. The nozzle frame 103 is illustrated topmost in the figure, followed, in this order, by the controller element 106, the luminaire element 108 and a grille 801, the purpose of which will be discussed hereinafter. The nozzle frame 103, the controller element 106 and the grille 801 are illustrated in FIG. 8 in cross-section. Of the principles described above, the combined luminaire and air conditioning nozzle of FIG. 8 follows mainly the principle illustrated in FIG. 2.

Outermost edges 802 of the nozzle frame 103 are shaped as parts of a convex spherical surface. This is one, mechanically relatively simple way to pivotably connect the nozzle frame to the opening of the front panel. The edges of the opening of the front panel may be shaped as parts of a corresponding concave spherical surface. Thus, the pivotable connection of the nozzle frame to the opening of the front panel has a structure of a ball joint where the parts 802 of the spherical surface in the nozzle frame are arranged to move in a socket formed by the edges of the opening of the front panel.

In the part of the outer edges of the nozzle frame 103 which is intended to the front side of the front panel there is an annular first slide surface 803 and a locking groove 804. The edges of the controller element 106 have a corresponding annular second slide surface 805 and a locking claw 806. These elements enable the attachment of the controller element 106 to the nozzle frame 103 with a rotatable connection. As the nozzle frame 103 and the controller element 106 of FIG. 8 are pressed against each other in a direction which in FIG. 8 is the vertical direction, the locking claw 806 snaps into the locking groove 804. It is then possible to rotate the controller element about the common geometrical centre axis 201 of the controller element and the nozzle frame, so that the first slide surface 803 and the second slide surface 805 slide against each other. The structure described herein is only one example of implementing the rotatable connection between the controller element 106 and the nozzle frame 103, and in addition or instead it is possible to use many other configurations that are known as such and/or obvious.

The controller element 106 has a first thread 807 with a longitudinal axis parallel to the geometrical centre axis 201 and in the assembled structure thereby substantially perpendicular to the front panel. The luminaire element 108 has a second thread 808 corresponding to and fitting on the first thread 807. By means of these threads the closing mechanism of the combined luminaire and air conditioning nozzle as illustrated in FIG. 8 is arranged to convert a rotational movement of the controller element 106 relative to the nozzle frame 103 into a linear movement of the luminaire element 108 relative to the nozzle frame 103 in a direction substantially perpendicular to the front panel. In a situation where the controller element 106 rotates but the luminaire element 108 does not, the first thread 807 drives the second thread 808 (and thus the entire luminaire element 108) in the direction of the geometrical centre axis 201 forward or backward, depending on in which direction the controller element 106 is rotated.

In order that the luminaire element 108 would not rotate with the controller element 106, it is advantageous that between the luminaire element 108 and the nozzle frame 103 there is a slide mechanism arranged to prevent rotation of the luminaire element 108 relative to the nozzle frame 103. In the combined luminaire and air conditioning nozzle illustrated in FIG. 8, this can be implemented for example such that a pin 809 arranged in the nozzle frame 103 and a corresponding, elongated hole within the second thread 808 (not shown in FIG. 8) are not round in cross-section. This way the luminaire element 108 is able to slide along the pin 809 in the direction of the geometrical centre axis 201, but not to rotate about it. It may be advantageous that the slide mechanism includes a limiter arranged to prevent movement of the luminaire element 108 further than a specific limit from the nozzle frame 103. The implementation of this type of a limiter is not shown in FIG. 8, but it may be implemented for example by providing the pin 809 and the luminaire element 108 with suitable corresponding surfaces that come into contact with each other to prevent further sliding when the luminaire element 108 has slid far enough.

A cable channel 810 extends centrally in the pin 809 for providing the luminaire element 108 with electric cables (not shown in FIG. 8). In the assembled structure these electric cables may be fed through the air cavity, and may be used for conducting the electric current needed to cause the light source located in the luminaire element 108 to output light. The location of the light source in the luminaire element 108 is not shown in FIG. 8, but it is preferably located in the downwardly widening part of the luminaire element 108. The light source is most preferably a semiconductor light source such as a led light source, a laser diode or an OLED. Further, the luminaire element 108 is most preferably provided with an optic for directing the light source output by the light source as desired on the front side of the front panel. The optic is represented by a lens 811 in FIG. 8.

As an example of the corresponding surfaces by means of which it is possible to implement the adjustable limiting of the air passage, FIG. 8 illustrates an edge 812 of a hole arranged in the controller element 106 and an outermost edge 813 of the widening part of the luminaire element. The adjustable limiting of the air passage is easily perceivable from FIGS. 9 and 10, illustrating the combined luminaire and air conditioning nozzle of FIG. 8 with the nozzle closed (FIG. 9) and the nozzle open (FIG. 10).

In FIG. 9 the controller element 106 has been rotated in a first direction relative to the nozzle frame 103 to a degree that the edge of the luminaire element 108 is pressed against the edge of the hole arranged in the controller element 106 at point 901. Thus, the air passage from the air cavity (above the elements illustrated in FIG. 9) to the front side of the front panel (below the elements illustrated in FIG. 9) is closed at point 901. In FIG. 10 the controller element 106 has been rotated in a second direction relative to the nozzle frame 103 to a degree that the luminaire element 108 has projected forward (in FIG. 10 downward) by about a third of its own length. In this case the air passage goes through an annular opening formed between the edge 812 of the hole arranged in the controller element 106 (see FIG. 8) and the luminaire element 108 arranged in said hole. The air flow through this annular opening is illustrated in FIG. 10 by arrows 1001 and 1002.

FIGS. 9 and 10 also illustrate the position of the grille 801 in the assembled structure against the front surface of the controller element 106 so as to cover most of it. The grille 801 may be attached to the controller element 106 for example with an interlocking joint consisting of slot-claw pairs formed in these elements (not shown in the figures). The grille 801 may serve an aesthetic purpose, i.e. it may be used to finish the look of the combined luminaire and air conditioning nozzle as desired. It may also function as a thermal protector. The light source in the luminaire element 108 outputs heat when it is switched on, and at least some of the heat must typically be conducted away along the structures of the combined luminaire and air conditioning nozzle. The controller element 106 may be manufactured from a material that conducts heat well and thus functions as part of the cooling configuration for the light source. A suitable material is, for example, aluminum or other metal with good thermal conduction; however, according to another embodiment the controller element 106 may also be manufactured for example from (thermally conductive) plastic or a composite utilizing an organic material. If the controller element 106 conducts heat well, its parts that are closest to the light source may become quite hot. The grille 801 may be used to cover these hottest parts, such that the user does not accidentally touch an uncomfortably or dangerously hot part.

The grille 801 may also contribute to directing the air flowing through the nozzle, especially if it and the rest of the structure around it are shaped so that at least part of the air flows through at least part of the grille.

The directing of light and air may be discussed with reference to FIGS. 11 and 12. As already stated, the luminary element is most preferably provided with a semiconductor light source and an optic for directing the light output by the semiconductor light source into a specific first sector on the front side of the front panel. In FIG. 11 the boundary lines of one first example sector are illustrated with dashed lines 1101 and 1102. The air passage may be arranged to direct the air flowing from the air cavity to the front side of the front panel into a specific second sector on the front side of the front panel. The boundary lines of one second example sector are illustrated with dashed lines 1103 and 1104.

In a typical application site of the combined luminaire and air conditioning nozzle the user would most likely want to direct his or her personally adjusted fresh air flow to him- or herself, but to direct his or her personally adjusted light slightly in front of him- or herself. This is because the purpose of the fresh air flow is to cool and refresh the user, while the purpose of the light is to illuminate a book, a handicraft or other object placed in front of the user in order for the user to see it well. If turning of the nozzle frame on its pivotable connection affects in the same way the directing of both of the light and the fresh air flow, it may be difficult to satisfy the user's needs described above at the same time.

There are many ways to solve this issue. One of them is to ensure, as in FIG. 11, that the above-mentioned second sector (the one into which the fresh air flow is directed) covers a wider solid angle than the above-mentioned first sector (the one into which the light is directed). This way, even if the user directed the light to an object placed in front of him or her, at least part of the fresh air flow falls in any case right on the user.

Another way is illustrated in FIG. 12. In this case the optic of the luminaire element is designed such that a centre axis 1201 of said first sector is oriented in a different direction than a centre axis 1202 of said second sector. In this type of configuration it is especially useful that the closing mechanism is arranged to convert a rotational movement of the controller element specifically into a linear movement of the luminaire element, not into a rotational movement, because this way the directing of the light relative to the user does not vary, even if the user rotated the controller element to change the intensity of the fresh air flow. Many types of optical equipment by which the light emitted by a light source can be directed in a desired way are known, and in addition to lenses they include for example various mirrors, prisms and diffractive microstructures and combinations of any of them. One rather simple option is to shape the luminaire element such that it is not axially symmetrical, but includes a slanted portion directing the light source and the light emitted by it in a desired direction. As an example of this FIG. 13 illustrates a luminaire element 108 with a slanted portion indicated with reference numeral 1301.

The embodiments described above are characterized by axial symmetry. To provide an intuitive user experience it may be advantageous that the controller element forms a round outer rim on the side of the nozzle frame facing towards the front side of the front panel. For a user it will be easy to perceive this type of a round outer rim as a controller, the rotation of which changes the intensity of the fresh air flow. The intuitiveness of the user experience may be increased even further by shaping the round outer rim formed by the controller element such that it incorporates a coarsening or other shape improving friction and/or creating an impression of a surface purposed to be grabbed by fingers.

However, axial symmetry is not an absolute requirement. There are also other ways to implement configurations in which the closing mechanism is arranged to convert a movement of the controller element into a movement of the luminaire element, so that the adjustable limiting of the air passage occurs as a result of the movement of the luminaire element produced this way. FIG. 14 illustrates one principle in which the controller element 106 is a type of lever and attached to the nozzle frame 103 with a rotatable connection, the rotation axis of which is parallel to a plane defined by the front panel 101. Matching toothings between the controller element 106 and the luminaire element 108 are arranged to convert a rotatable movement of the controller element 106 relative to the nozzle frame 103 into a linear movement of the luminaire element 108 relative to the nozzle frame 103 in a direction substantially perpendicular to the front panel 101. The parts of the closing mechanism adjustably limiting the air passage 107 from the air cavity to the front side of the front panel 101 in response to a movement of the controller element 106 may be similar to those applied, for example, in the configurations following the principle of FIG. 3 or 5.

The embodiments of the invention described above by way of example are not intended to be limiting; instead, they illustrate some examples of implementing the characteristic features of the invention in practice. Features described in connection with a specific embodiment may be combined with features described in connection with some other embodiment, unless explicitly stated otherwise in this text.

The invention claimed is:

1. A combined luminaire and air conditioning nozzle, comprising:
   a front panel with an opening,
   a nozzle frame pivotably connected to the opening of the front panel and arranged to separate an air cavity located behind the front panel from a front side of the front panel, and
   a controller element with a closing mechanism mechanically coupled thereto and arranged to adjustably limit an air passage from the air cavity to the front side of the front panel in response to a movement of the controller element,
   wherein:
   a luminaire element forms part of the closing mechanism and is provided with a light source arranged to output light to the front side of the front panel, and
   the closing mechanism is arranged to convert a movement of the controller element into a movement of the luminaire element, so that the adjustable limiting of the air passage occurs as a result of the movement of the luminaire element,
   the nozzle frame and the controller element share a common geometrical centre axis substantially perpendicular to the front panel
   the controller element is attached to the nozzle frame with a rotatable connection,
   the movement of the controller element is its rotational movement about the common geometrical centre axis, and
   the closing mechanism is arranged to convert a rotational movement of the controller element relative to the nozzle frame into a linear movement of the luminaire element relative to the nozzle frame in a direction substantially perpendicular to the front panel.

2. The combined luminaire and air conditioning nozzle according to claim 1, wherein
the controller element has a first thread with a longitudinal axis substantially perpendicular to the front panel,
the luminaire element has a second thread corresponding to and fitting on the first thread, and
between the luminaire element and the nozzle frame there is a slide mechanism arranged to prevent rotation of the luminaire element relative to the nozzle frame.

3. The combined luminaire and air conditioning nozzle according to claim 2, wherein the slide mechanism is provided with a limiter arranged to prevent a movement of the luminaire element further away from the nozzle frame than what the limiter allows.

4. The combined luminaire and air conditioning nozzle according to claim 1, wherein
the luminaire element includes a semiconductor light source and an optic for directing the light output by the semiconductor light source into a specific first sector on the front side of the front panel, and
the air passage is arranged to direct the air flowing from the air cavity to the front side of the front panel into a specific second sector on the front side of the front panel.

5. The combined luminaire and air conditioning nozzle according to claim 4, wherein the second sector covers a wider solid angle than the first sector.

6. The combined luminaire and air conditioning nozzle according to claim 4, wherein a centre axis of the first sector is oriented in a different direction from a centre axis of the second sector.

7. The combined luminaire and air conditioning nozzle according to claim 1, wherein the air passage goes through an annular opening formed between an edge of a hole arranged in the controller element and the luminaire element arranged in the hole.

8. The combined luminaire and air conditioning nozzle according to claim 1, wherein the pivotable connection of the nozzle frame to the opening of the front panel has a structure of a ball joint where parts of a spherical surface in the nozzle frame are arranged to move in a socket formed by edges of the opening of the front panel.

9. The combined luminaire and air conditioning nozzle according to claim 1, wherein the controller element forms a round outer rim on the side of the nozzle frame facing towards the front side of the front panel.

* * * * *